US009179035B2

(12) United States Patent
Kurilin et al.

(10) Patent No.: US 9,179,035 B2
(45) Date of Patent: Nov. 3, 2015

(54) METHOD OF EDITING STATIC DIGITAL COMBINED IMAGES COMPRISING IMAGES OF MULTIPLE OBJECTS

(75) Inventors: Ilya Vasilievich Kurilin, Novosibirsk (RU); Ho-keun Lee, Suwon-si (KR); Ilya Vladimirovich Safonov, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 117 days.

(21) Appl. No.: 13/551,887

(22) Filed: Jul. 18, 2012

(65) Prior Publication Data
US 2013/0021629 A1    Jan. 24, 2013

(30) Foreign Application Priority Data

Jul. 19, 2011   (RU) .............................. 2011129843
Jul. 4, 2012    (KR) ....................... 10-2012-0072682

(51) Int. Cl.
G06K 9/34      (2006.01)
H04N 1/60      (2006.01)
H04N 1/387     (2006.01)

(52) U.S. Cl.
CPC .......... H04N 1/3873 (2013.01); H04N 1/3878 (2013.01)

(58) Field of Classification Search
CPC ........................ H04N 1/3873; H04N 1/3878
USPC ....................................................... 382/173
See application file for complete search history.

(56) References Cited

U.S. PATENT DOCUMENTS

| | | | |
|---|---|---|---|
| 6,385,351 B1 * | 5/2002 | Simske et al. | 382/312 |
| 6,956,587 B1 | 10/2005 | Anson | |
| 7,483,589 B2 | 1/2009 | Ahmed et al. | |
| 7,542,608 B2 | 6/2009 | Yeh et al. | |
| 7,734,058 B1 | 6/2010 | Adams et al. | |
| 7,805,003 B1 * | 9/2010 | Cohen et al. | 382/173 |
| 7,945,116 B2 | 5/2011 | Curtis | |
| 2006/0158700 A1 | 7/2006 | Byun et al. | |

(Continued)

FOREIGN PATENT DOCUMENTS

| | | |
|---|---|---|
| EP | 0991263 | 4/2000 |
| KR | 1020060084467 | 7/2006 |

OTHER PUBLICATIONS

Extended European Search Report dated Jul. 30, 2014 issued in EP Application No. 12176844.4.

*Primary Examiner* — Barbara Reinier
*Assistant Examiner* — Christopher D Wait
(74) *Attorney, Agent, or Firm* — Staas & Halsey LLP

(57) ABSTRACT

A method of editing a combined image which includes a plurality of object images. This editing method includes displaying an outline rectangle which forms outlines of one or more object images within the combined image, and when a predetermined first operation is performed on an object image selected from among the object images located within the outline rectangle, segmenting the selected object image and another object image located within the outline rectangle, and alternatively, when a predetermined second operation is performed on an object image selected from among the object images located within the outline rectangle, combining the selected object image with another object image located within an outline rectangle other than the outline rectangle. After the segmenting or combining is performed, renewing displaying of the outline rectangle according the segmenting or combining result.

19 Claims, 12 Drawing Sheets

(56) References Cited

U.S. PATENT DOCUMENTS

2006/0209214 A1 9/2006 Fader et al.
2006/0228044 A1 10/2006 Yeh et al.
2007/0122062 A1* 5/2007 Jacobs .......................... 382/305
2008/0247005 A1 10/2008 Marappan

* cited by examiner

METHOD OF EDITING STATIC DIGITAL COMBINED IMAGES COMPRISING IMAGES OF MULTIPLE OBJECTS

CROSS-REFERENCE TO RELATED APPLICATIONS

This application claims priority under Russian Patent Application No. 2011129843, filed on Jul. 19, 2011, in the Russian Patent Office, and Korean Patent Application No. 10-2012-0072682, filed on Jul. 4, 2012, in the Korean Intellectual Property Office, the contents of which are incorporated herein by reference in their entirety.

BACKGROUND OF THE INVENTION

1. Field of the Invention

The present general inventive concept relates to an image processing method, and more particularly to a method of editing static digital combined images comprising a plurality of object images.

2. Description of the Related Art

Multi-Function Devices (MFC) are becoming increasingly popular recently. These devices are similar to a scanner or printer, and are equipped with an integrated system which can process various functions and problems. For example, an MFD may provide a function such as cropping or alignment of automatically removing an object image from a scanned image. Although it is difficult to make improvements regarding this function, there is a need for a function which automatically processes a combined image which includes a plurality of object images.

Conventional art includes various devices and methods aimed at resolving problems related to automatic processing of combined images. Especially, "Segmentation of Rectangular Objects Lying on an Unknown Background in a Small Preview Scan Image" [1] in a thesis written by Michael Guerzhoy and Hui Zhou at a Canadian conference on computer and robot vision in 2008 (CRV 2009) is one of those methods. This thesis [1] discloses a method of segmenting a rectangular object lying on a background having a texture which has been processed lightly with a color that is unknown in advance. This method is based on a set of heuristic methods of detecting edges of a rectangular object and a rough estimation on a background color in a process of generating a preliminary assumption on the existence of a rectangular object on an image selected after the most plausible assumption. Authors of the thesis [1] argue that the explained solution can discover objects which are repeated and adjacent to one another such as photos, bills or plastic cards in small size preview images. Nevertheless, an application program of the aforementioned solution is limited by an assumption of a significant color differentiation between the object and background.

"Recursive method to detect and segment multiple rectangular objects in scanned images" [2], a thesis announced by C. Herley at the 2003 IEEE symposium, for example, is based on identifying and segmenting rectangular objects which may include various distortions such as rough edges and smooth corners. The author of the thesis [2] believed that it was possible to obtain an effective and stable tool for segmentation by establishing a one dimensional projection. In addition, the author of the thesis [2] started from an assumption that the purpose of operation is in segmenting the objects from other objects based on the one dimensional project while each object display a consistent area. In fact, as in most of the cases, an object has a very little difference from the background and use of the explained resolving method may be recognized as a segmentation group divided spacially. The method explained in U.S. Pat. No. 7,483,589 [3] provides automatic framing of the document according to location changes and alignments of various documents existing in images. Herein, an application program where it is possible to copy a copy check bill which seems to be leveled and ordered is mentioned. In addition, for an automatic segmentation of object images, a critical processing of the initial image and an application program of morphological operation is used together. Therefore, the result of segmentation depends on the connectivity of each object. When the connectivity of each object is broken, it may lead to distortion of the segmentation result.

The method explained in U.S. Pat. No. 7,542,608 [4] provides an automatic framing of objects on images, and includes detecting planimetric lines of the objects, segmenting the images, and combining the images. Herein, in order to segment the images into background area and a plurality of foreground areas, an algorithm which searches for coherent constituent elements is used. Furthermore, in order to combine the foreground areas, distances between the foreground areas are calculated, in which case if a distance is smaller than a predetermined value, the areas are combined. In addition, this method combines smaller areas with bigger areas based on an estimation of the size of outline, while checking convenience of such a combination. If a width and length of an object exceed a predetermined value, the combination is deemed to be inappropriate. Assuming that this size is segmentation of the approximately known object, this condition is limited by the aforementioned application program.

As aforementioned, there are numerous problems related to developing an automatic method regarding segmentation of a plurality of object images displayed on one image. One of the most complex problem lies in detection of a light or white object image which may be segmented in parts during the processing procedure. The second most complex problem lies in separation of object images located closely to one another.

SUMMARY OF THE INVENTION

The present general inventive concept provides methods of editing a combined image which includes an automated process of extraction and separation of object images, and apparatuses which perform the same.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of editing a combined image comprising a plurality of object images, and the method may include displaying an outline rectangle which forms outlines of one or more object images within the combined image; when a predetermined first operation is performed on an object image selected from among the object images located within the outline rectangle, segmenting the selected object image and another object image located within the outline rectangle; when a predetermined second operation is performed on an object image selected from among the object images located within the outline rectangle, combining the selected object image with another object image located within an outline rectangle other than the outline rectangle; and renewing displaying of the outline rectangle according the segmenting or combining.

In addition, the method may further include determining coordinates of vertexes of an outline rectangle which forms outlines of the object image in the combined image, wherein the displaying may display an outline rectangle which forms outlines of the object image within the combined image according to the determined coordinates of vertexes.

In addition, the determining coordinates of vertexes of an outline rectangle may include scaling the combined image with a predetermined resolution; converting the scaled combined image into a binary image; detecting foreground and background areas in the binary image; classifying the area according to a predetermined category; combining the foreground areas into groups based on the classification result; and calculating coordinates of vertexes of the outline rectangle on each group combined.

In addition, the converting the scaled combined image into a binary image may include applying a gamma revision to the scaled combined image; converting an image where the gamma revision is applied into a half-tone image; detecting an edge in the half-tone image; performing critical-value processing of the half-tone image; performing OR logical calculation on each pixel of the half-tone images critical-value processed half-tone images corresponding to each pixel of the half-tone image which includes the detected edge; deleting an area of which its size does not exceed a predetermined critical value in the combined binary image; and deleting an area adjacent to the detected edge in the combined binary image.

In addition, the classifying the area according to the predetermined category may include detecting a straight line portion on each side of the detected foreground area; estimating a parameter of the detected straight line portion; calculating mutual alignment of the detected straight line portion; if the calculated mutual alignment corresponds to a rectangle shape, classifying the foreground areas into foreground areas having rectangle shapes; if the calculated mutual alignment corresponds to a straight line shape, classifying the foreground areas into foreground areas having straight line shapes; if a distance between the foreground areas having rectangle shapes does not exceed a predetermined value, classifying a portion of a background located between the foreground areas having rectangle shapes into a background area located between areas having rectangle shapes; and classifying areas that are not classified by the above classification into foreground areas having shapes other than rectangle shapes.

In addition, the combining the foreground areas into groups based on the classification result may include analyzing whether or not a crossing occurred by a descending order of sizes of rectangles in order to detect another area which crosses the foreground areas classified into the foreground areas having rectangle shapes; if the another crossed area is not an area classified into a background area located between the areas having rectangle shapes, as a result of the analysis, combining the another crossed area with the area having rectangle shapes into one group; updating coordinates of vertexes of the outline rectangle according to the combination; analyzing a difference of distance and skew angle of the foreground areas classified into areas having rectangle shapes and the foreground areas classified into areas having straight line shapes; if the difference of distance and skew angle do not exceed a predetermined value, as a result of the analysis, combining the areas having straight line shapes and the areas having rectangle shapes into one group; updating coordinates of vertexes of the outline rectangle according to the combination; if there is searched a foreground area having a shape other than rectangle shape of which a distance from the foreground areas classified into the areas having rectangle shapes is smaller than a predetermined value, combining the foreground area having a shape other than a rectangle shape with the areas having rectangle shapes into one group; updating coordinates of vertexes of the outline rectangle according to the combination; searching for a foreground area having a shape other than a rectangle shape which is not grouped with the areas having rectangle shapes; and if there is searched a foreground area having a shape other than rectangle shape which is not grouped with the areas having rectangle shapes, as a result of the search, and a size of the area is bigger than a predetermined value, calculating coordinates of vertexes of the outline rectangle on the area.

In addition, the predetermined first operation may be an operation of moving the selected object image to a free location of the combined image which is not occupied by the outline rectangle which includes the selected object image, and the predetermined second operation may be an operation of moving the selected object image inside an outline rectangle other than the outline rectangle which includes the selected object image.

In addition, the moving operation may be performed by a drag and drop operation.

Meanwhile, the foregoing and/or other features and utilities of the present general inventive concept may also be achieved by providing a user terminal which may include a display unit which displays a GUI (Graphic User Interface) to edit a combined image which includes a plurality of object images; a user interface unit which receives an input of a user manipulation on the GUI; and a control unit which, when a predetermined first operation is performed on an object image selected from among object images located within an outline rectangle, segments the selected object and another object image located within the outline rectangle, or when a predetermined second operation is performed on an object image selected from among object images located within an outline rectangle, combines the selected object image with another object image located within an outline rectangle other than the outline rectangle, and renews displaying of the outline rectangle according to the segmenting or combining; wherein the outline rectangle is an identifier which forms outlines of the object image within the combined image.

In addition, the predetermined first operation may be an operation of moving the selected object image to a free location of the combined image which is not occupied by the outline rectangle which includes the selected object image, and the predetermined second operation may be an operation of moving the selected object image inside an outline rectangle other than the outline rectangle which includes the selected object image.

In addition, the moving operation may be performed by a drag and drop operation.

Meanwhile, the foregoing and/or other features and utilities of the present general inventive concept may also be achieved by providing an image forming apparatus which may include a scanning unit which generates a combined image which includes a plurality of object images corresponding to a read manuscript; a display unit which displays a GUI (Graphic User Interface) to edit the generated combined image; a user interface unit which receives an input of a user manipulation on the GUI; a control unit which, when a predetermined first operation is performed on an object image selected from among object images located within an outline rectangle, segments the selected object and another object image located within the outline rectangle, or when a predetermined second operation is performed, combines the selected object image from among object images located within the outline rectangle with another object image located within an outline rectangle other than the outline rectangle, and renews displaying of the outline rectangle according to the segmenting or combining; wherein the outline rectangle is an identifier which forms outlines of the object image within the combined image.

In addition, the predetermined first operation may be an operation of moving the selected object image to a free location of the combined image which is not occupied by the outline rectangle which includes the selected object image, and the predetermined second operation may be an operation of moving the selected object image inside an outline rectangle other than the outline rectangle which includes the selected object image.

In addition, the moving operation may be performed by a drag and drop operation.

Meanwhile, the foregoing and/or other features and utilities of the present general inventive concept may also be achieved by providing a recording medium which stores a program code to perform an editing method in an apparatus to edit a combined image comprising a plurality of object images, and the editing method may include displaying an outline rectangle which forms outlines of one or more object images within the combined image; when a predetermined first operation is performed on an object image selected from among the object images located within the outline rectangle, segmenting the selected object image and another object image located within the outline rectangle; when a predetermined second operation is performed on an object image selected from among the object images located within the outline rectangle, combining the selected object image with another object image located within an outline rectangle other than the outline rectangle; and renewing displaying of the outline rectangle according the segmenting or combining.

According to various exemplary embodiments of the present disclosure, regarding GUI, a method of automatically determining coordinates of vertexes of an outline rectangle is suggested. According to this method, it is possible to automatically process extraction of object images, and provide rapid speed by the user, minimum operations, and also, it is possible to flexibly modify the automatically processed results manually.

In addition, according to various exemplary embodiments of the present disclosure, it is possible to segment an object image into a plurality of portions or provide a semiautomatic method of combining into a plurality of object images.

In addition, according to according to various exemplary embodiments of the present disclosure, segmentation quality may be improved since the priority order of automatic analysis is determined according to classification results.

Furthermore, according to various exemplary embodiments of the present disclosure, the background area located between the area having rectangle shape is classified into a separate area, thereby preventing errors due to combination of adjacent rectangle objects.

The foregoing and/or other features and utilities of the present general inventive concept may be achieved by providing a method of editing a combined image comprising a plurality of object images, the method comprising: displaying an outline rectangle which forms an outline around one of more of the object images within the combined image; segmenting a selected object image from other object images located within the outline rectangle when a predetermined first operation is performed on the selected object image; combining a selected object image within the outline rectangle with another object image located within an outline rectangle other than the outline rectangle when a predetermined second operation is performed on the selected object image; and updating the displaying to display the outline rectangle including the performed segmenting or combining operation.

In an exemplary embodiment, the predetermined first operation is an operation of moving the selected object image to a free location of the combined image outside the outline rectangle which includes the selected object image, and the predetermined second operation is an operation of moving the selected object image inside an outline rectangle other than the outline rectangle which includes the selected object image.

In an exemplary embodiment, the moving operation may be performed by a drag and drop operation.

The foregoing and/or other features and utilities of the present general inventive concept may be achieved by providing a method of editing a combined image comprising a plurality of object images, the method comprising: displaying an outline rectangle to be manipulated; segmenting a selected object image from other object images within a displayed outline rectangle when a segmenting request is received; combining a selected object image within a displayed outline rectangle with another object image within another outline rectangle when a combining request is received; and updating the displaying of the outline rectangle to illustrate the segmenting or combining result.

In an exemplary embodiment, the segmenting request may be performed by moving the selected object image outside the outline rectangle, and the combining request is performed by moving the selected object image to a location within the other outline rectangle.

The foregoing and/or other features and utilities of the present general inventive concept may be achieved by providing a method of editing a combined image comprising a non-transient computer readable recording medium which stores a program code to perform an editing method, the method comprising: displaying an outline rectangle which forms an outline around one of more of the object images within the combined image; segmenting a selected object image from other object images located within the outline rectangle when a predetermined first operation is performed on the selected object image; combining a selected object image within the outline rectangle with another object image located within an outline rectangle other than the outline rectangle when a predetermined second operation is performed on the selected object image; and updating the displaying to display the outline rectangle including the performed segmenting or combining operation.

The foregoing and/or other features and utilities of the present general inventive concept may be achieved by providing a method of editing a combined image comprising a non-transient computer readable recording medium which stores a program code to perform an editing method, the method comprising: displaying an outline rectangle to be manipulated; segmenting a selected object image from other object images within a displayed outline rectangle when a segmenting request is received; combining a selected object image within a displayed outline rectangle with another object image within another outline rectangle when a combining request is received; and updating the displaying of the outline rectangle to illustrate the segmenting or combining result.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
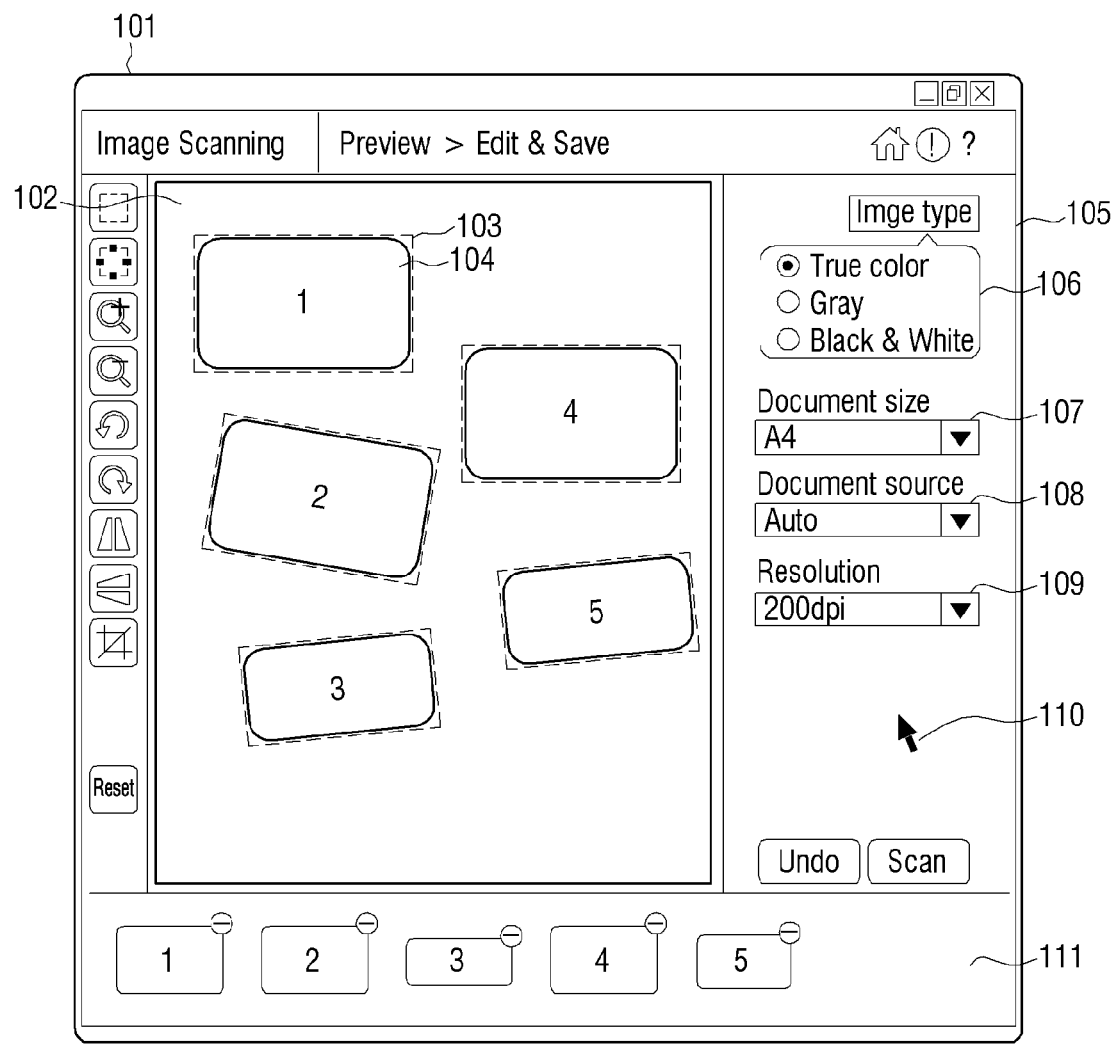
FIG. 1 is a view illustrating a graphic user interface which embodies a method of editing combined images including a plurality of object images according to an exemplary embodiment of the present disclosure.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a view illustrating a graphic user interface which embodies a method of editing a combined image which includes a plurality of object images according to an exemplary embodiment of the present disclosure. Herein, the graphic user interface for embodying the editing method may be operated by an image forming apparatus or a user terminal. In addition, a combined image may preferably be a scanned image generated after distancing a plurality of manuscripts on a scanner unit and then scanning them. In this case, each of the plurality of object images may be an image formed by a scanning of each of the plurality of manuscripts. However, the combined object image is not limited thereto, but may be an editable image pre-stored in the image forming apparatus/ user terminal or an editable image transmitted from an external device connected to the image forming apparatus/user terminal.

An object image may be an image of a photograph, a memo, a page of a book, a business card, a check, etc.

Herein, the image forming apparatus refers to an apparatus which prints print data, generated in a terminal such as a computer, on a recording medium. Examples of an image forming apparatus include a copier, a printer, a facsimile, and a Multi Function Peripheral (MFP) which embodies all the aforementioned functions in one apparatus.

In addition, a user terminal may be a personal computer, a PDA (Personal Digital Assistant), a laptop, a notebook, a tablet computer, a portable terminal (for example, mobile terminal device etc.)

With reference to FIG. 1, the graphic user interface 101 to edit a combined image may include a preview area 102 for the combined image, a rectangle 103 which is automatically identified and then manually edited by a user, object images 104 included in the combined image, an area 105 which determines an option parameter, a cursor 110, and an area 111 which consecutively displays extract object images. In addition, the area 105 which determines an option parameter includes an area 106 which determines an input image type, an area 107 which determines a size of a document, an area 108 to select a document input source, and an area 109 to select a scan resolution. Herein, the rectangle 103 determines a portion to be extracted from an initial combined image.

Meanwhile, the graphic user interface may provide an environment to edit the rectangle 103, that is, adjusting sizes, skew angles and locations of the rectangle 103 in the initial combined image, to correct errors which may occur during performing an automatic calculation of vertexes of the rectangle 103 and realization of user preference.

Herein, the graphic user interface in FIG. 1 is a mere example of a graphic user interface, and thus a configuration of the graphic user interface and of menus thereof may be changed in various formats.

Figure 2:
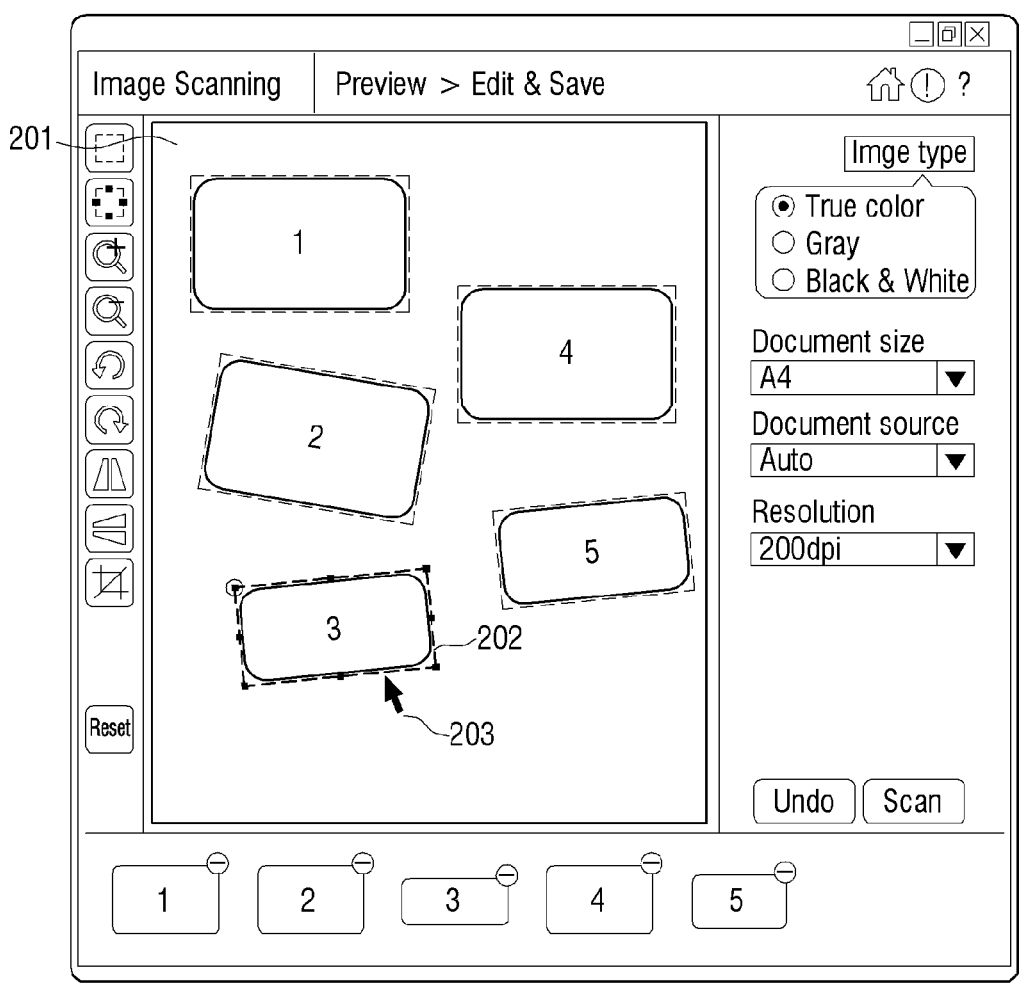
FIG. 2 is a view illustrating a graphic user interface which embodies an operation of identifying an object image displayed by a rectangle according to an exemplary embodiment of the present disclosure.

FIG. 2 is a view illustrating a graphic user interface which embodies an operation of identifying an object image displayed by a rectangle according to an exemplary embodiment of the present disclosure. With reference to FIG. 2, the graphic user interface includes a preview area 201 of a combined image, a changed outline rectangle 202, and cursor 203. When an object image is selected through the cursor 203 in the preview area 201 of the combined image, an outline rectangle 202 corresponding to the selected object image is changed and is displayed as a changed outline rectangle 202. Herein, the changed outline rectangle 202 may be changed back into the outline rectangle before conversion, through an editing process of the cursor 203 (for example, when re-selecting the selected object image).

In addition, the changed outline rectangle 202 may adjust its size, angle, and location, etc. However, the adjustments are not limited thereto, and an adjustment may be made even when the outline rectangle is not changed.

In addition, herein, a similar user interface device such as a mouse, keyboard, touch screen, etc., which a user allows for joint operation may also be used as an embodiment of the graphic user interface. In this case, an operation of changing the outline rectangle 202 through the mouse may be performed by pressing or releasing (clicking) the mouse button. Furthermore, when using the touch screen, the cursor may not be displayed on the graphic user interface.

Figure 3:
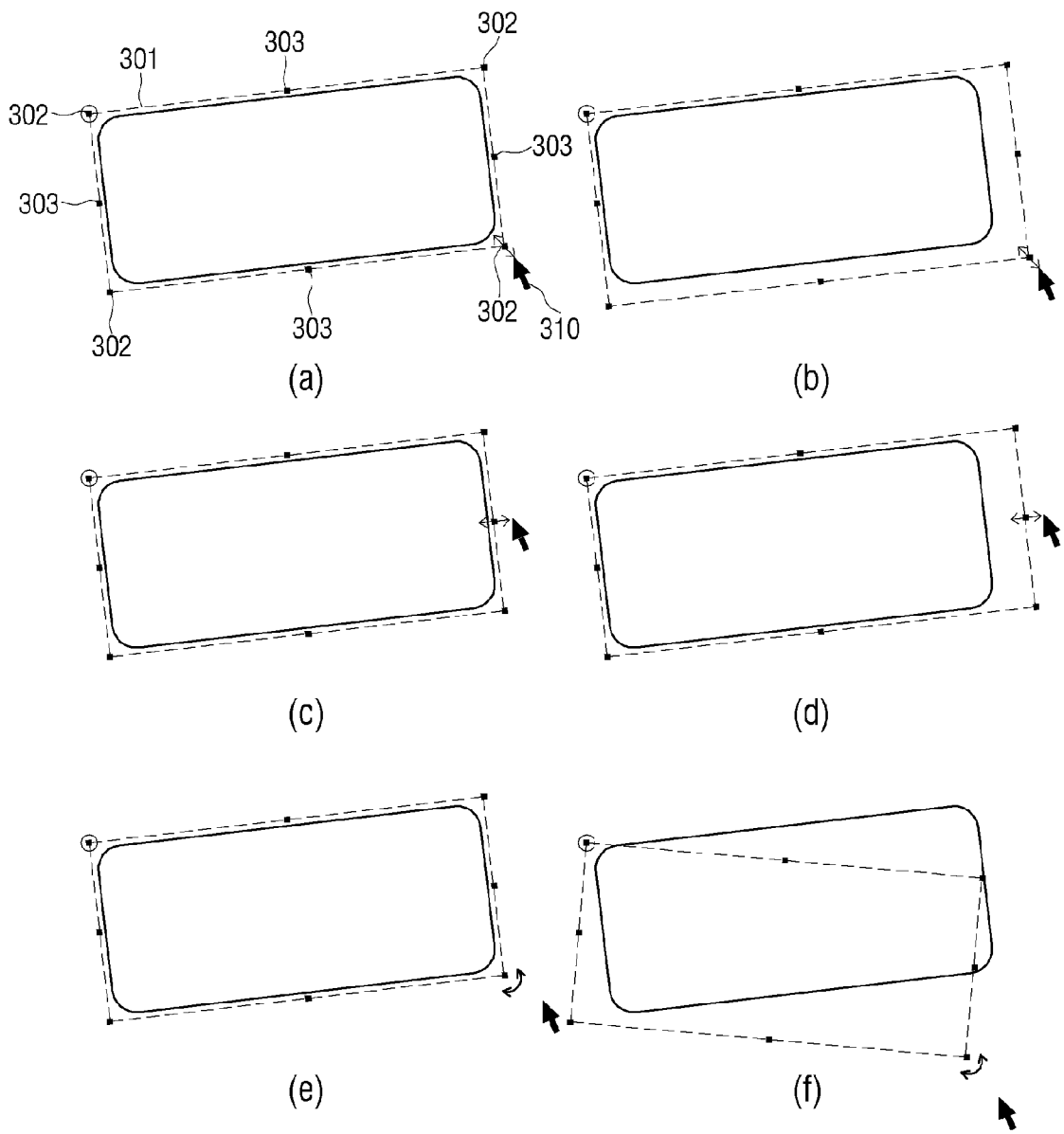
FIG. 3 is a view explaining an operation of adjusting sizes and angles of a rectangle according to an exemplary embodiment of the present disclosure.

FIG. 3 is a view explaining an operation of adjusting sizes and angles of a rectangle according to an exemplary embodiment of the present disclosure. With reference to FIG. 3, adjusting the outline rectangle 301 may be performed by mutual reactions of the user interface apparatus which controls the cursor 310 and by special labels. These labels may generally be placed on vertexes 302 of the outline rectangles 301 and on mid points 303 between the end vertexes of the outline rectangles. Herein, the labels are preferably displayed in such a manner that they are easily identified in the outline rectangles 301.

Herein, the labels may be used to perform two types of operations (adjusting sizes and angles) in the process of editing the outline rectangles 301. In addition, activating one of the two types may differ according to a distance between a selected label and a cursor 310.

That is, as in FIG. 3(a), in a case where a distance between a cursor 310 and a label on a vertex 302 of an outline rectangle is equal to or less than a predetermined value, a mode which adjusts a size of the outline rectangle 301 may be activated. In this case, as in FIG. 3(b), the labels on the vertexes 302 of the outline rectangle may perform a proportional changing of a size of the outline rectangle.

In addition, as in FIG. 3(c), in a case where a distance between a cursor 310 and a mid point 303 of two end vertexes of the outline rectangle is equal to or less than a predetermined value, a mode which adjusts a size of the outline rectangle 301 may be activated. In this case, as in FIG. 3(d), the labels on the mid points 303 of the both end vertexes of the outline rectangle may perform changes in one direction of a size of the outline rectangle 301. Furthermore, as in FIG. 3(e), in a case where a distance between a cursor 310 and label on a vertex 302 of the outline rectangle exceeds a predetermined value, a mode which adjusts angles of the outline rectangle 301 may be activated. In this case, as in FIG. 3(f), a center of rotation may be allocated to a top left vertex of the outline rectangle 301 located in a diagonal direction of a selected label. However, the center of rotation is not limited thereto, and a user may change the center of rotation through the user interface apparatus, according to the user's selection.

Figure 4:
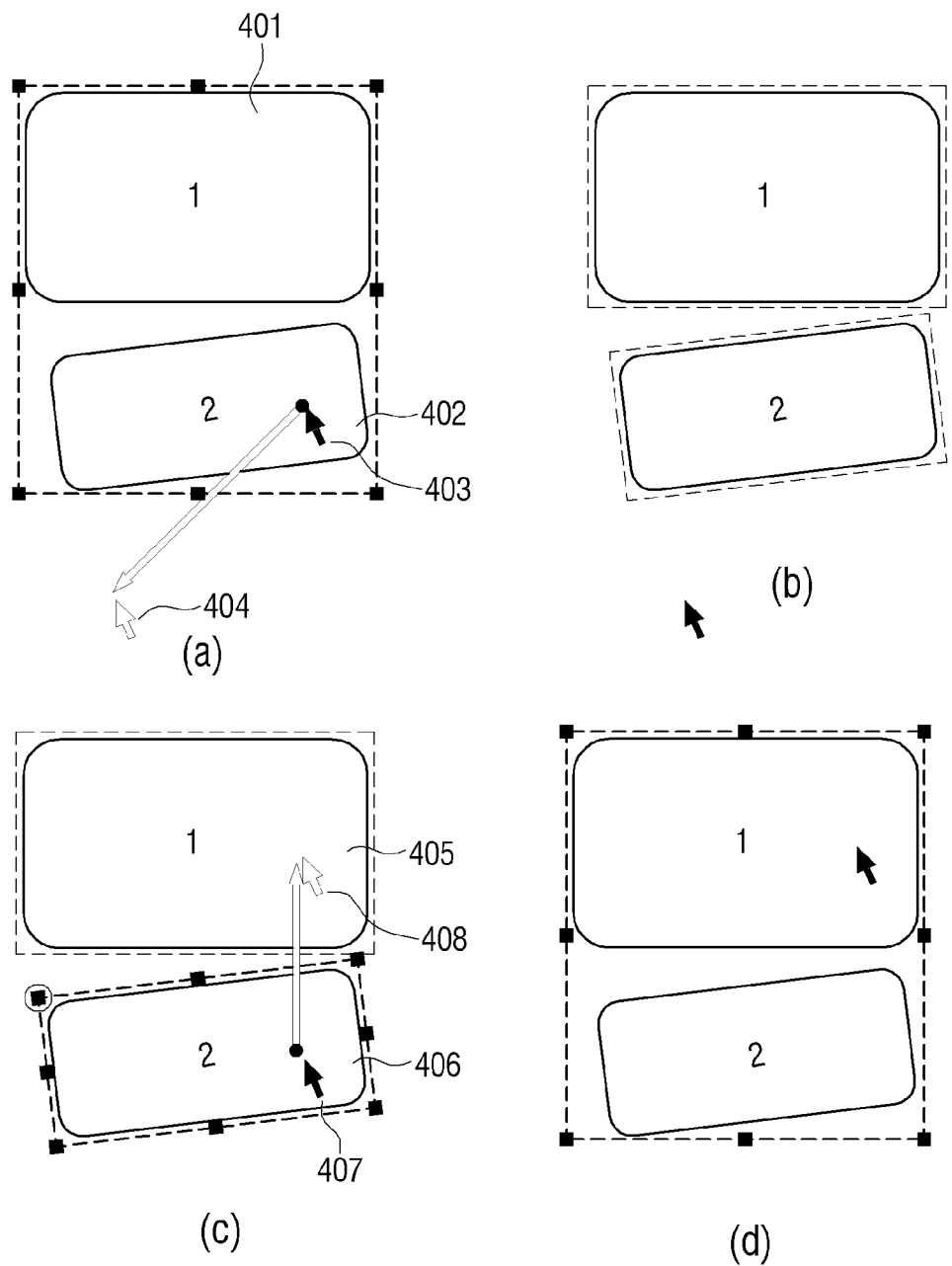
FIG. 4 is a view explaining a semiautomatic operation which segments object images and combines numerous object images according to an exemplary embodiment of the present disclosure.

FIG. 4 is a view explaining a semi-automatic operation of segmenting an object image and combining numerous object images. FIG. 4 illustrates an operation of segmenting an outline rectangle (see FIG. 4(a)) which includes two object images 401 and 402 into two outline rectangles (see FIG. 4(b)) each of which includes each of the object images (FIG. 4(a), (b)), and an operation of combining outline rectangles each of which includes an object image 405 and 406 into one outline rectangle (FIG. 4(c), (d)).

Herein, the segmenting operation may be performed according to a "drag"/"move" action by the user interface apparatus. That is, a segmenting operation may start from an internal portion of an outline rectangle and end at a free location of an image not occupied by the outline rectangle. In FIGS. 4(a) and (b), a black color cursor 403 corresponds to a location of a starting portion of a "drag" operation, while a grey color cursor 404 corresponds to a predictable final location. When the drag is finished, the outline rectangle which includes two object images 401 and 402, as in FIG. 4(a), may be segmented into outline rectangles each of which includes one object image as in FIG. 4(b).

In addition, a combining operation may also be performed according to a "drag"/"move" action by the user interface apparatus. That is, a combining operation may start from an internal portion of an outline rectangle of a first object image 406 and end at an internal portion of an outline rectangle of a second object image 405. In FIG. 4(c), a black color cursor 407 corresponds to a starting location of a "drag" operation, while a grey color cursor 408 corresponds to a predictable final operation of this operation. When the drag is finished, outline rectangles each of which includes each of object images 405 and 406 as in FIG. 4(d) may be combined into one outline rectangle as in FIG. 4(d).

However, the present disclosure is not limited to the aforementioned, but may perform combining and segmenting operations in various methods according to embodying methods.

Figure 5:
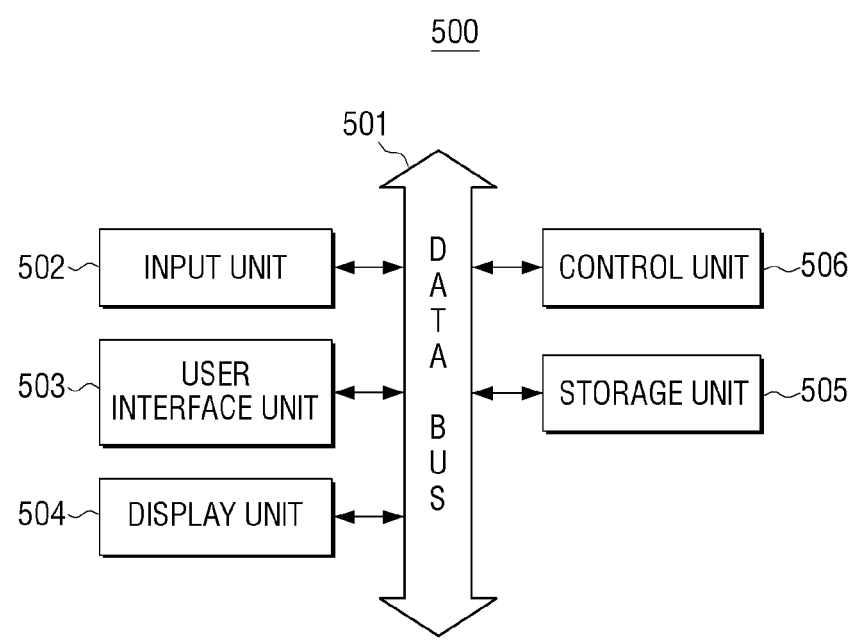
FIG. 5 is a block diagram illustrating a device to edit a combined image which includes a plurality of object images according to an exemplary embodiment of the present disclosure.

FIG. 5 is a block diagram illustrating an apparatus to edit a combined image which includes a plurality of object images according to an exemplary embodiment of the present disclosure. With reference to FIG. 5, the apparatus 500 may include a data bus 501, input unit 502, user interface unit 503, display unit 504, storage unit 505, and an entirety or portion of a control unit 506. Herein, the apparatus 500 may be a user terminal or an image forming apparatus. In a case where the apparatus 500 is embodied into an image forming apparatus, the input unit 502 may be embodied into a scanning unit which reads a manuscript, and the apparatus 500 may further include a printing unit (not illustrated) which prints a read image.

The data bus 501 performs a role of a passage which transmits data among modules.

The input unit 502 may receive an input of a combined image which includes a plurality of object images. In a case where the apparatus 500 is embodied into a user terminal, the input unit 502 may receive an input of a combined image which has been scanned from the image forming apparatus connected to the user terminal. In this case, the input unit 502 may provide the scanned combined image input from the image forming apparatus to the control unit 506.

In a case where the apparatus 500 is embodied into an image forming apparatus, the input unit 502 may be embodied into a scanning unit which reads a manuscript, and when a scanned combined image is generated accordingly, the scanning unit may provide the generated combined image to the control unit 506.

However, the present disclosure is not limited to the aforementioned, but a combined image may be pre-stored in the storage unit 505 of the image forming apparatus/user terminal, and may be provided through an external device connected to the image forming apparatus/user terminal.

The user interface unit 503 performs a function of enabling a user to determine or select various functions that the apparatus 500 provide. Especially, the user may perform manipulations on the aforementioned graphic user interface through the user interface unit 503.

Herein, the user interface unit 503 may be embodied into a device where both input and output functions are embodied, such as a touch pad, etc., or may be embodied into a combination of an input device such as a mouse or keyboard and a display device such as a CRT monitor, LCD monitor, and LED etc.

The display unit 504 performs a function of displaying a screen. Especially, the display unit 504 may display the aforementioned graphic user interface.

Herein, the display unit may be embodied into at least one of a liquid crystal display, a thin film transistor-liquid crystal display, an organic light-emitting diode), a flexible display, a 3D display, and a transparent display.

The storage unit 505 performs a function of storing various programs and data needed for operations of the apparatus 500.

Herein, the storage unit 505 may be embodied into not only an internal type storage device such as RAM (Random Access Memory), flash memory, ROM (Read Only Memory), EPROM (Erasable Programmable ROM), EEPROM (Electronically Erasable and Programmable ROM), register, hard disk, removable disk, memory card etc., but also into a detachable storage device such as a USB memory, and CD-ROM etc.

The control unit 506 controls overall operations of the apparatus 500. More specifically, the control unit 506 may control all or some of the data bus 501, the input unit 502, the user interface unit 503, the display unit 504, and the storage unit 505.

Especially, the control unit 506 may automatically determine coordinates of a vertex of an outline rectangle which forms an outline for a plurality of object images included in a combined image. More specifically, the control unit 506 may perform the aforementioned function by controlling the apparatus 500 to perform operations such as in FIGS. 7, 8, 9, and 11. This will be explained hereinafter with reference to FIGS. 7, 8, 9, and 11.

In addition, the control unit 506 may control the display unit 504 to display an outline rectangle which forms an outline of a plurality of object images according to determined coordinates of a vertex. In addition, when a determined first operation is performed on an object image selected through the user interface unit 503, the control unit 506 may segment the selected object image into at least two object images as a response to the first operation.

Herein, the first operation may be a drag and drop operation which starts from the selected object image and ends at an area not occupied by the outline rectangle of the selected object image.

In addition, when a predetermined second operation is performed on an object image selected through the user interface unit 503, the control unit 506 may combine the selected object image with another object image as a response to the second operation.

Herein, the second operation may be a drag and drop operation which starts from the selected object image and ends at the other object image.

In addition, when at least one of the segmenting and the combining operations is performed, the control unit 506 may update coordinates of a vertex of an outline rectangle which determines an object image in a combined image.

Furthermore, the control unit 506 may extract an object image according to updated coordinates of an outline rectangle.

Herein, the control unit 506 may include a CPU, ROM where control programs are stored, and RAM which remembers input data or is used as a memory area related to operations. Herein, the CPU, ROM, and RAM may be mutually connected to one another through an internal bus.

Figure 6:
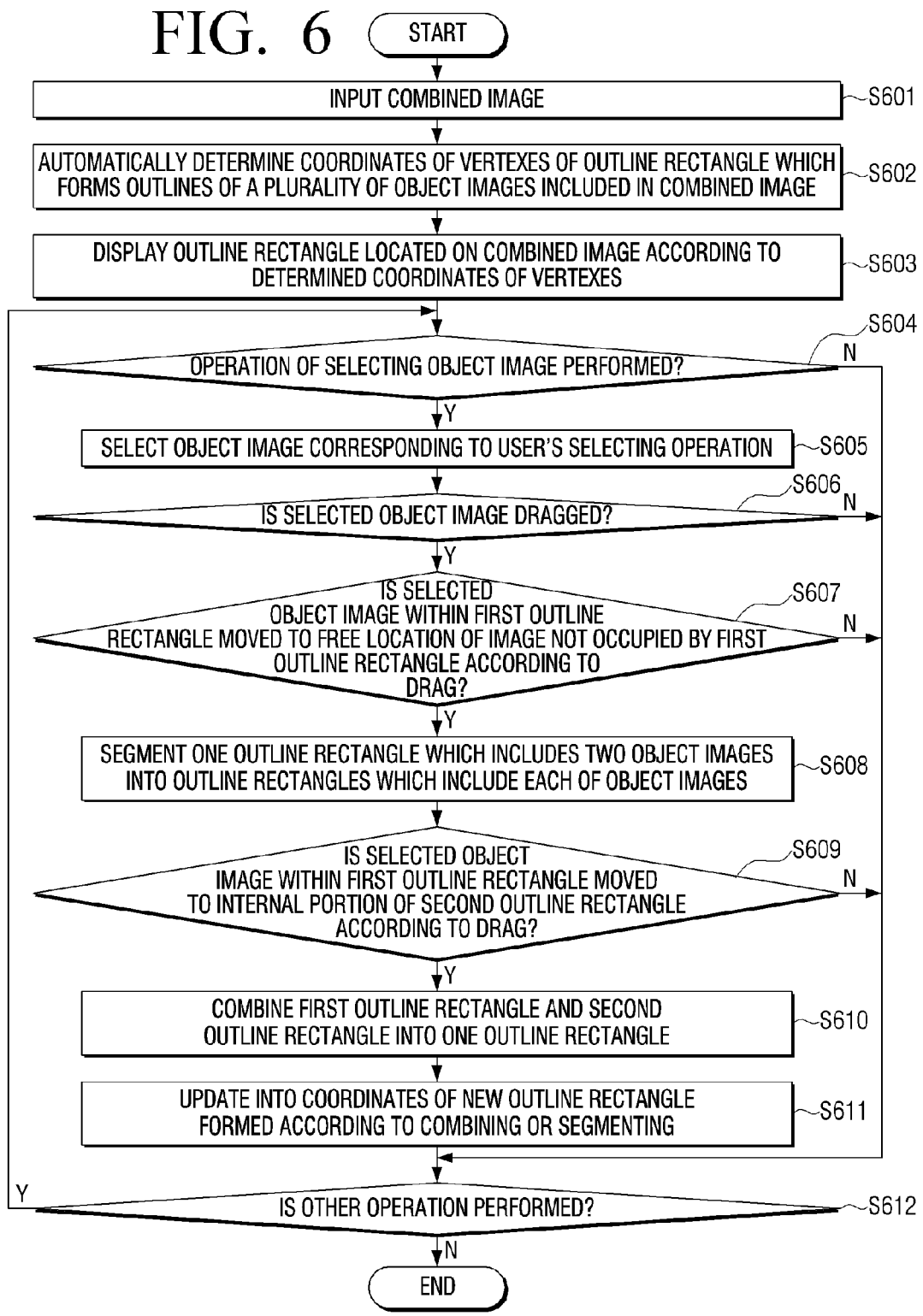
FIG. 6 is a flowchart explaining a method of segmenting and combining an object image through a graphic user interface according to an exemplary embodiment of the present disclosure.

FIG. 6 is a flowchart explaining a method of segmenting and combining object images through a graphic user interface according to an exemplary embodiment of the present disclosure. With reference to FIG. 6, first of all, a combined image is input (operation S601). Then, coordinates of vertexes of an outline rectangle which forms outlines of (i.e.: around) a plurality of object images included in the combined image are determined (operation S602). Herein, operation S602 may be performed by the control unit 506 according to an algorithm stored in the storage unit 505.

In addition, an outline rectangle is displayed on the combined image according to the determined coordinates of the vertexes (operation S603). Herein, the outline rectangle may be displayed as in the graphic user interface illustrated in FIG. 1. If the combined image input as a result of performing operation S602 does not include an object image, the next operation S603 does not display an outline rectangle on the graphic user interface. In such a case however, the user may make an additional adjustment.

Next, when a selecting operation by the user interface unit is performed (operation S604:Y), an object image corresponding to the user's selecting operation is selected (operation S605). Herein, a response to the user's selecting operation may be displayed as in the graphic user interface illustrated in FIG. 2.

In addition, when the selected object image is dragged by the user interface unit (operation S606:Y), and the object image included in the first outline rectangle is free-location moved to an area not occupied by the first outline rectangle (operation S607:Y), the outline rectangle which includes two object images are segmented into two outline rectangles each of which includes one object image (operation S608). For example, each of the two outline rectangles will include a respective single object image.

Furthermore, when the object image included in the first outline rectangle is moved to an internal portion of a second outline rectangle by the user interface unit (operation S609: Y), the first outline rectangle and second outline rectangle each of which includes an object image are combined into one outline rectangle (operation S610).

In addition, new coordinates of outline rectangles formed by combining or segmenting as aforementioned are updated (operation S611).

If operations S604, S606, S607, and S609 are not performed, it is determined whether or not another operation is performed by the user interface unit (operation S612). If no other operation is performed by the user interface unit, the process ends (operation S612:N). But if another operation is performed by the user interface unit (operation S612:Y), it is determined whether or not a selecting operation is performed by the user interface unit (operation S604).

Figure 7:
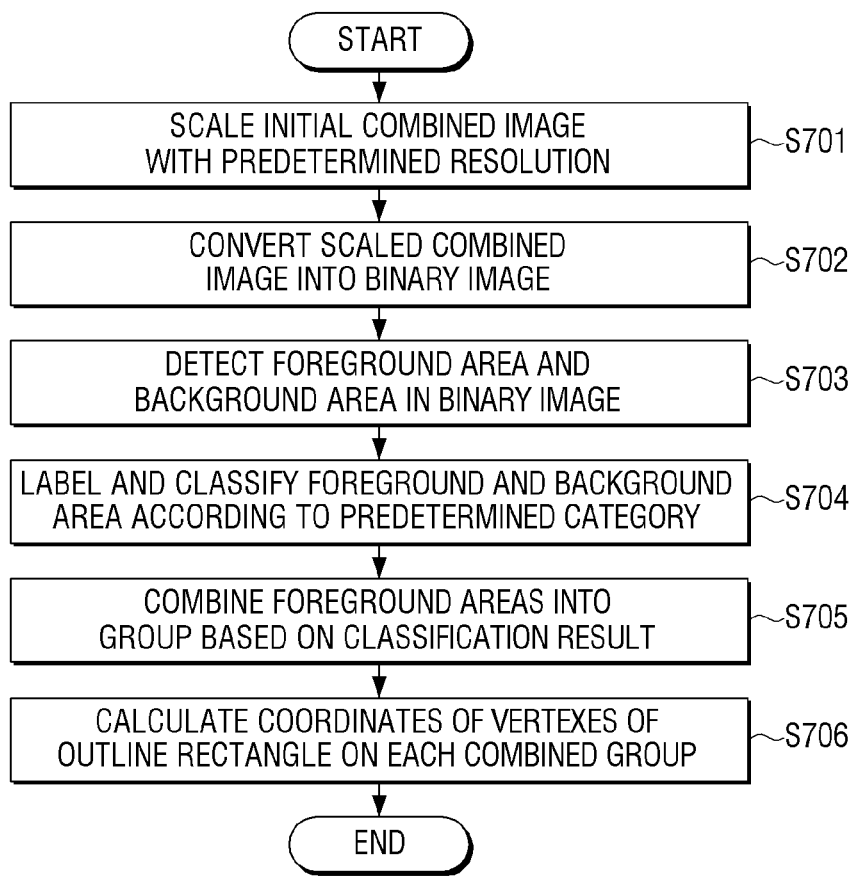
FIG. 7 is a flowchart explaining a method which automatically determines coordinates of a rectangle according to an exemplary embodiment of the present disclosure.

FIG. 7 is a flowchart explaining a method (operation S602) of automatically determining coordinates of an outline rectangle according to an exemplary embodiment of the present disclosure. With reference to FIG. 7, when a combined image which includes a plurality of object images is input, first of all, the initial combined image is scaled into a predetermined resolution (operation S701). Herein, the predetermined resolution may be 75 DPT, but it is not limited thereto. In a case of performing a scaling of reducing the resolution, calculations made in the process where the control unit 506 automatically determines coordinates of an outline rectangle may be reduced, thus reducing the processing time.

Furthermore, the scaled combined image is converted into a binary image (operation S702). Accordingly, each point corresponding to a foreground and background of the scaled combined image may be converted into a binary image.

In addition, areas of the foreground and background are detected from the binary image (operation S703). More specifically, by marking a load congestion of points of adjacent images, it is possible to detect the foreground and background areas from the binary image.

In addition, the foreground and background areas are labeled and classified according to a predetermined category (operation S704). More specifically, areas that are related to one another are labeled with a same label and then classified. Herein, such a labeling aims at making an order of each area.

In addition, the foreground areas are combined into groups based on the classification result (operation S705). More specifically, the foreground areas adjacent to one another may be combined into a group based on the classification result.

In addition, coordinates of vertexes of each outline rectangle in each combined group are calculated (operation S706).

Figure 8:
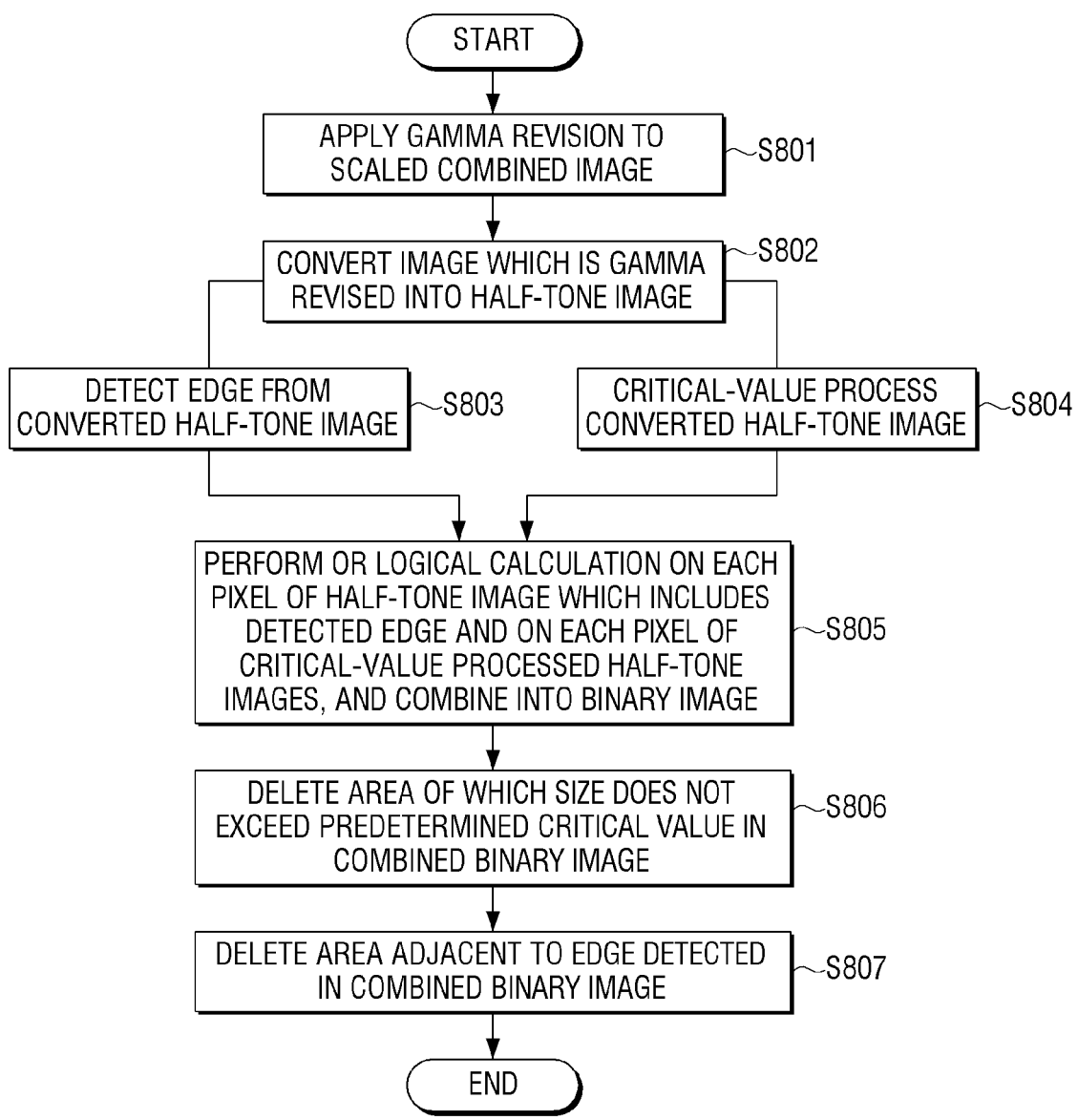
FIG. 8 is a flowchart explaining a method of converting an initially combined image into a binary image according to an exemplary embodiment of the present disclosure.

FIG. 8 is a flowchart explaining a method (operation S702) of converting an initial combined image into a binary image according to an exemplary embodiment of the present disclosure. With reference to FIG. 8, a gamma revision is applied to a scaled combined image (operation S801). Then, the image where the gamma revision is applied is converted into a half-tone image (operation S802).

Herein, an edge is detected from a converted half-tone image (operation S803). More specifically, by comparing a result of Sobelja filtering with a predetermined critical value, the edge may be detected from the converted half-tone image.

In addition, the converted half-tone image is critical-value processed (operation S804). More specifically, by comparing the converted half-tone image with the predetermined critical value, the aforementioned process may be performed.

Furthermore, each pixel of the binary images generated by operation S803 is combined with each pixel of the binary images generated by operation S804 through OR logical calculation (operation S805).

Such a combination may provide a differentiated characteristic to detecting an area which is a subsequent operation. Edge detecting is a necessary operation regarding a bright object image where there may be loss in processing a critical value according to brightness. Furthermore, processing a critical value according to brightness may generate a continuous area, thereby preventing an image having a structure being segmented into pieces.

In addition, subsequent operations S806 and S807 may be applied to reduce noise in a combined binary image.

In addition, from a combined binary image, an area of which the size does not exceed a predetermined critical value is deleted (operation S806). Herein, a predetermined critical value of a size of the combined binary image may be determined to be 80 pixel on an image scaled to have 75 DPI resolution, but it is not limited thereto.

In addition, areas adjacent to the edge detected from the combined binary image are deleted (operation S807). Herein, operation S807 is an operation to avoid segmentation errors caused by shadows of boundaries of a scanned object. This shadow effect sometimes occurs in scan images if a cover of a scanner is closed incompletely. Therefore, operation S807 may detect and remove shadow.

Operations S806 and S807 may be applied to reduce noise in the combined binary image.

Figure 9:
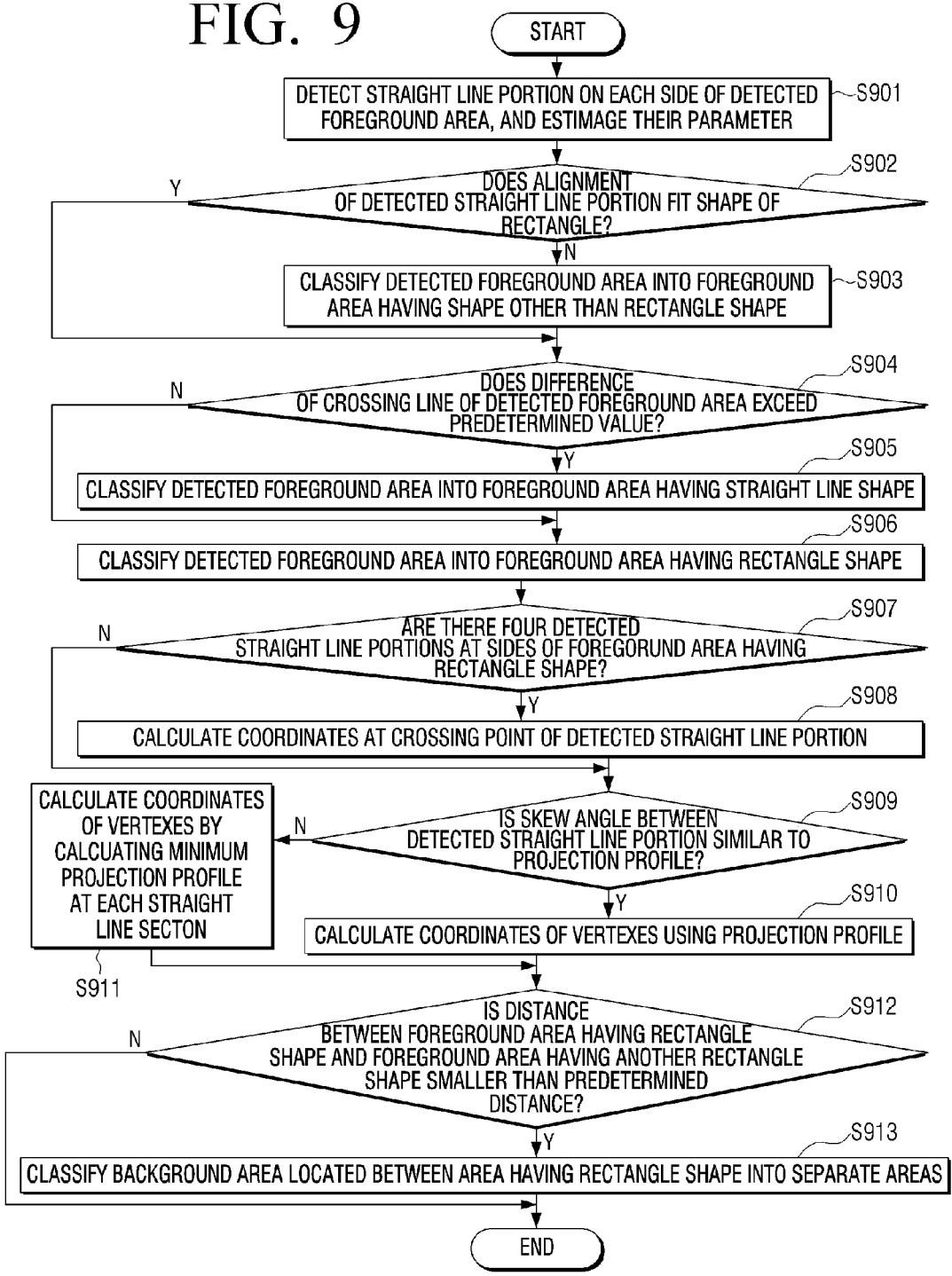
FIG. 9 is a flowchart explaining a method of classifying areas in an echelon image according to an exemplary embodiment of the present disclosure.

FIG. 9 is a flowchart explaining a method (operation S704) of classifying areas on a binary image according to an exemplary embodiment of the present disclosure. Herein, an area may be classified into 4 types. More specifically, it may be classified into a foreground area having a rectangular shape, a foreground area having a straight line shape, a background area which is located in between areas having rectangular shapes, and a foreground area having a shape other than a rectangular shape.

With reference to FIG. 9, first of all, straight line portions of each side (top, bottom, left and right) of a detected foreground area are detected, and their parameters are estimated (operation S901).

Herein, detecting a straight line portion may consist of the following: first, an outline rectangular of the foreground area is calculated; then, a closest distance from each side (top, bottom, left and right) of the outline rectangle to a pixel of the foreground area is calculated. Herein, a derivative of an array of the estimated distance is calculated. Then, a straight line section within the derivative of the array is selected, and a value for each straight line section is calculated. Then, if a summary length value of the straight line section exceeds a predetermined value, a straight line portion of each side (top, bottom left and right) of the detected foreground area is detected, and their parameters are calculated. However, detecting a straight line portion is not limited to the aforementioned method, but may be performed by applying various methods such as Hough Transformation.

Next, it is determined whether or not an array of the detected straight line portion fits a shape of a rectangle (operation S902). Herein, a shape of a rectangle may be a shape where at least two line portions are detected, an angle of crossing lines in the straight line portion is about 90 degrees, and a line on the other line also has about a 90 degree angle.

If the array of the detected straight line portion does not fit the shape of a rectangle as a result of determination (operation S902:N), the area is classified into a foreground area having a shape other than a rectangle shape (operation S903).

If the array of the detected straight line portion fits the rectangle shape (operation S902:Y) and a difference of lines crossing at right angles in the area exceeds a predetermined value (operation S904:Y), the present area is classified into a foreground area having a straight line shape (operation S905). For example, in a case where a length difference of a first straight line portion and a second straight line portion of the straight line portion crossing each other exceeds 10 times, the present area may be classified into a foreground area having a straight line shape.

If operation S904 is not satisfied (operation S904:N), the area is classified into a foreground area having a rectangle shape (operation S906).

In addition, if there are 4 detected straight line portions at a side of a foreground area having a rectangle shape (operation S907: Y), coordinates of a crossing point of the detected straight line portion are calculated (operation S908).

If there aren't 4 detected straight line portions at a side of a foreground area having a rectangle shape (operation S907:N), coordinates may be calculated using a projection.

More specifically, if a skew angle between the detected straight line portions is similar to a projection profile (operation S909:Y), coordinates of a vertex may be calculated using a skew angle direction projection between the detected straight line portions and a vertical direction projection which determines a left and right boundary (operation S910).

If the skew angle between the detected straight line portions is significantly different from the projection profile (operation S909:N), coordinates of a vertex may be calculated by calculating a minimum project profile at each straight line section (operation S911).

In addition, in a case where a distance between a foreground area having a rectangle shape and a foreground area having another rectangle shape is smaller than a predetermined distance (operation S912:Y) a background area located between the area having the rectangle shape is classified into a separated area (operation S913). By doing this, in a case of performing a combination according to the aforementioned operation S705, it is possible to prevent combination errors of foreground areas having rectangle shapes located adjacently to one another.

Figure 10:
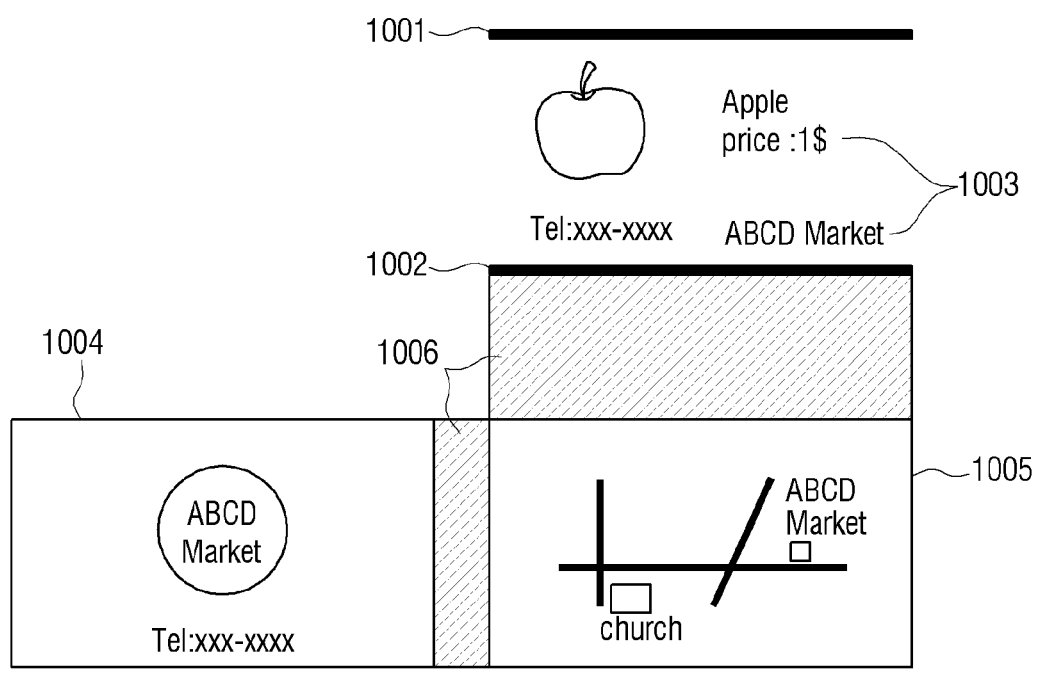
FIG. 10 is a view illustrating a result of classification according to an exemplary embodiment of the present disclosure.

FIG. 10 is a view illustrating a classification result according to an exemplary embodiment of the present disclosure. FIG. 10 includes foreground areas 1001 and 1002 having straight line shapes, foreground areas 1004 and 1005 having rectangle shapes, foreground area 1003 having a shape other than a rectangle shape, and a background area 1006 located between foreground areas having rectangle shapes located close to one another.

Figure 11:
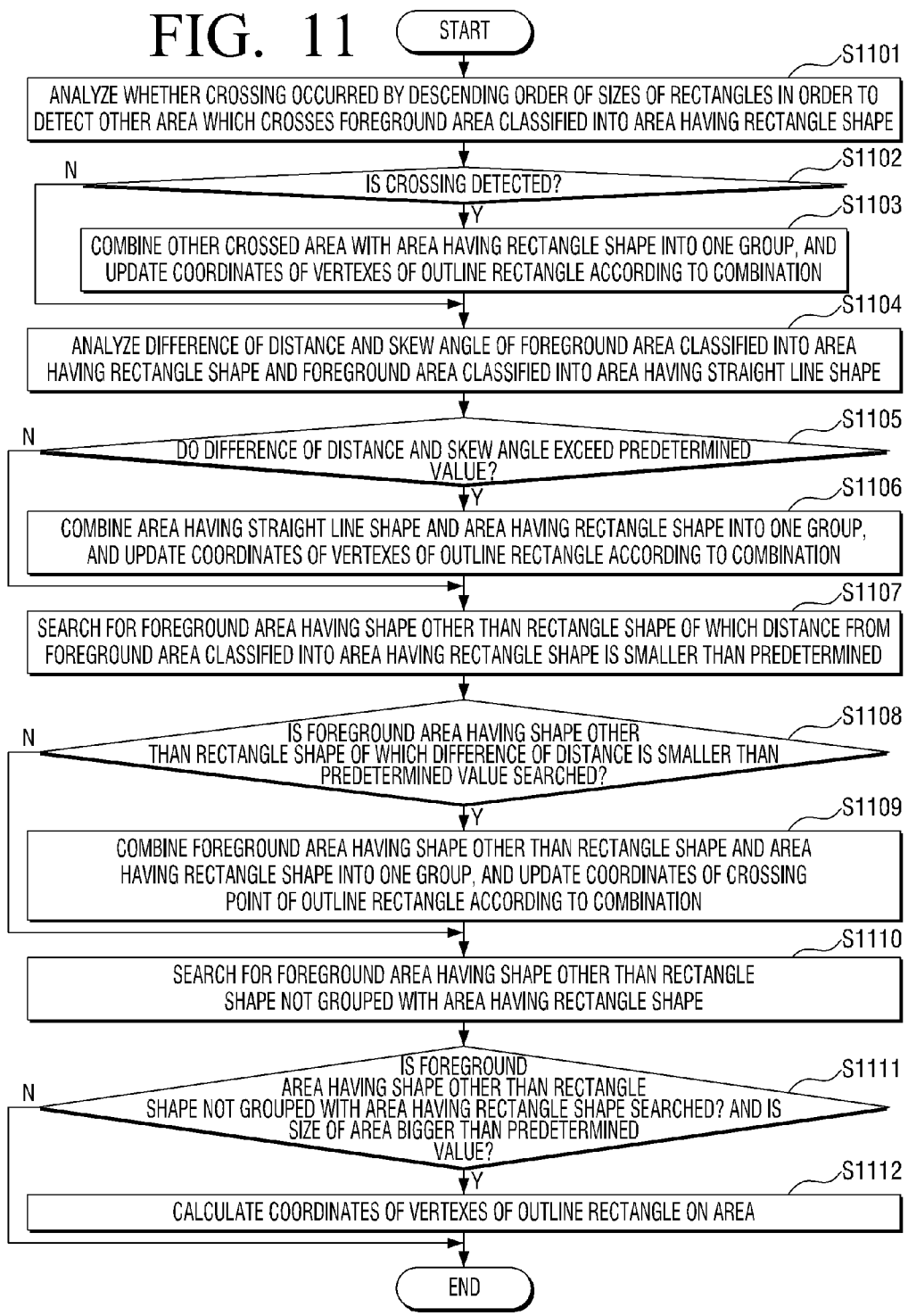
FIG. 11 is a flowchart explaining a method of combining coherent areas in a group according to an exemplary embodiment of the present disclosure.

FIG. 11 is a flowchart explaining a method (operation S705) combining areas adjacent to one another into groups according to an exemplary embodiment of the present disclosure. With reference to FIG. 11, first of all, in order to detect another area which crosses a foreground area classified into an area having a rectangle shape, whether a crossing has occurred in a descending order of sizes of rectangles (operation S1101) is analyzed.

When a crossing is detected (operation S1102:Y), the other area which is crossed is combined into a group with an area having a rectangle shape, and coordinates of vertexes of the outline rectangle are updated according to the combination (operation S1103).

Herein, updating coordinates of vertexes of an outline rectangle may include the following steps: checking a crossing of a foreground area classified into an area having a rectangle shape and a background area located between foreground areas having rectangle shapes; and when they cross each other, cancelling combination into one group, in which case coordinates of vertexes may be coordinates of vertexes of an area having a rectangle shape for which combining operation has been cancelled.

Herein, operations S1101, S1102, and S1103 may be repeated until all foreground areas having rectangle shapes are analyzed.

In addition, a difference of distance and a difference of skew angle between a foreground area classified into an area having a rectangle shape and a background area classified into an area having a straight line shape are analyzed (operation S1104). Herein, operation S1104 may include the following steps: selecting an area classified into a foreground area having a rectangle shape; calculating a difference of distance between the selected area and a closest area having a rectangle shape; and calculating a difference of skew angle between the selected area and a closest area having a rectangle shape.

If the aforementioned difference of distance and difference of skew angle do not exceed a predetermined value as a result of determination (operation S1105:N), the area having a straight line shape and the area having a rectangle shape are combined into one group, and coordinates of vertexes of the outline rectangle are updated (operation S1106). If operation S1105 is not satisfied (operation S1105:N), combination into one group may be cancelled.

Herein, operations S1104, S1105, and S1106 may be repeated until all foreground areas having a straight line shape are analyzed.

In addition, the predetermined value of a difference of distance between areas may be 1.5 inch, and the predetermined value of a difference of skew angle between the areas may be 1.15 degree. However, this is merely an exemplary embodiment of the present disclosure and the values are not limited to the aforementioned figures.

In addition, a search is performed for a foreground area having a shape other than a rectangle shape of which the distance from the foreground area classified into an area having a rectangle shape is smaller than the predetermined value (operation S1107).

In a case where the aforementioned difference of distance is smaller than the predetermined value as a result of the search (operation S1108:Y), the foreground area having a shape other than a rectangle shape and the area having a rectangle shape are combined into one group, and coordinates of vertexes of the outline rectangle are updated according to the combination (operation S1109). If operation S1108 is not satisfied (operation S1108:N), combination into one group may be cancelled.

Herein, operation S1107, S1108, and S1109 may be repeated until all non-classified areas are analyzed.

In addition, the difference of distance between the areas may be 0.33 inch. However, this is merely an exemplary embodiment of the present disclosure, and thus the difference of distance is not limited to the aforementioned figure, but may be any value which provides the intended purposes of the inventive concept as described herein.

In addition, a search is performed for a foreground area having a shape other than a rectangle shape not grouped with the areas having rectangle shapes (operation S1110).

As a result of the aforementioned search, if a foreground area having a shape other than a rectangle shape not grouped with the areas having rectangle shapes is searched, and the size of the area is bigger than the predetermined value (operation S1111:Y), coordinates of vertexes of the outline rectangle on the area are calculated (operation S1112).

Figure 12:
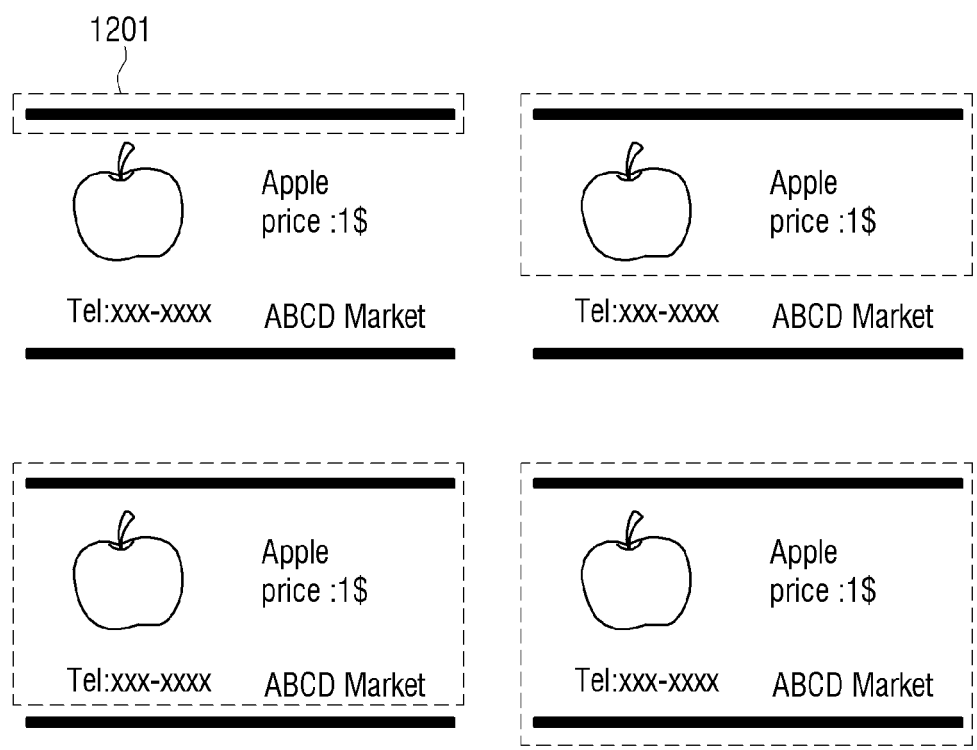
FIG. 12 is a view illustrating examples of combining coherent areas in a group according to an exemplary embodiment of the present disclosure.

FIG. 12 illustrates exemplary operations of combining areas adjacent to one another into a group, according to an exemplary embodiment of the present disclosure. As in FIG. 12, combining areas adjacent to one another starts from area 1201, and may be continued until they are adjacent to the outline rectangle or until the crossing areas are combined into one group.

Meanwhile, an automatic generating process for an outline rectangle according to an exemplary embodiment of the present disclosure does not require intervention by the user. Nevertheless, when deemed necessary, the user may perform a segmenting or combining operation (see FIGS. 4, 4.1 and 4.2) in the automatically generated result. Especially, a step of segmenting an area of a combined image and making them as separate elements may be performed by the following operation.

An area within an outline rectangle of a selected object is selected. If the number of the selected area is one, it is regarded that segmenting is impossible and the process ends.

If the number of the selected area is two, coordinates of vertexes of the outline rectangle are calculated and then the process ends. Otherwise, the number of the selected areas is determined in consideration of only those classified into rectangle objects.

If the number of the selected area exceeds two, coordinates of vertexes of the outline rectangle are calculated regardless of possible crossings, and the process ends. Otherwise, the selected area is combined into a group by operation S705, and the process ends, but combination of areas into one group is repeated. As a result of areas and groups, coordinates of vertexes of the outline rectangle are calculated regardless of possible crossings, and the process ends.

In a case where a segmenting process by operation S608 fails, the original outline rectangle is not changed but remains, whereas if the segmenting process succeeds, at least into two objects, the original rectangle is replaced by a combination of generated outline rectangles.

Meanwhile, an editing method according to various exemplary embodiments of the present disclosure may be embodied into program codes and stored in various types of recording media. More specifically, the editing method may be stored in various types of terminal-readable recording media such as a RAM(Random Access Memory), flash memory, ROM(Read Only Memory), EPROM(Erasable Programmable ROM), EEPROM(Electronically Erasable and Programmable ROM), register, hard disk, removable disk, memory card, USB memory, and CD-ROM etc.

Accordingly, a program may be installed so that the aforementioned editing method may be executed in an apparatus which is connected or mounted to such a recording medium.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of editing a combined image comprising a plurality of object images, the method comprising:
   determining coordinates of vertexes of an outline rectangle which forms outlines of an object image within the combined image, and displaying the outline rectangle according to the determined coordinates of vertexes;
   when a predetermined first operation is performed on an object image selected from among the object images located within the outline rectangle by performing a drag operation on the selected object from an internal portion of the outline rectangle to an outside of the outline rectangle, segmenting the selected object image and another object image located within the outline rectangle;
   when a predetermined second operation is performed on an object image within the outline rectangle selected from among the object images by performing the drag operation on the selected object image into another outline rectangle other than the outline rectangle, combining the selected object image with another object image located within the another outline rectangle; and
   renewing displaying of the outline rectangle according the segmenting or combining,
   wherein the determining the coordinates of the vertexes includes scaling the combined image with a predetermined resolution prior to converting the scaled combined image into a binary image, and calculating the coordinates of the vertexes using groups determined based on classifying areas of the binary image according to a predetermined category.

2. The method according to claim 1, further comprising:
   determining coordinates of vertexes of an outline rectangle which forms outlines of the object image in the combined image,
   wherein the displaying displays an outline rectangle which forms outlines of the object image within the combined image according to the determined coordinates of vertexes.

3. A method of editing a combined image comprising a plurality of object images, the method comprising:
   displaying an outline rectangle which forms outlines of an object image within the combined image;
   when a predetermined first operation is performed on an object image selected from among the object images located within the outline rectangle, segmenting the selected object image and another object image located within the outline rectangle;
   when a predetermined second operation is performed on an object image selected from among the object images located within the outline rectangle, combining the selected object image with another object image located within an outline rectangle other than the outline rectangle;
   renewing displaying of the outline rectangle according the segmenting or combining; and
   determining coordinates of vertexes of an outline rectangle which forms outlines of the object image in the combined image,
   wherein the displaying displays an outline rectangle which forms outlines of the object image within the combined image according to the determined coordinates of vertexes, and
   wherein the determining coordinates of vertexes of an outline rectangle comprises:
   scaling the combined image with a predetermined resolution;
   converting the scaled combined image into a binary image;
   detecting foreground and background areas in the binary image;
   classifying the area according to a predetermined category;
   combining the foreground areas into groups based on the classification result; and
   calculating coordinates of vertexes of the outline rectangle on each group combined.

4. The method according to claim 3, wherein the converting the scaled combined image into a binary image comprises:
   applying a gamma revision to the scaled combined image;
   converting an image where the gamma revision is applied into a half-tone image;
   detecting an edge in the half-tone image;
   performing critical-value processing of the half-tone image;
   performing OR logical calculation on each pixel of the half-tone images critical-value processed half-tone images corresponding to each pixel of the half-tone image which includes the detected edge;
   deleting an area of which its size does not exceed a predetermined critical value in the combined binary image; and
   deleting an area adjacent to the detected edge in the combined binary image.

5. The method according to claim 3, wherein the classifying the area according to the predetermined category comprises:
   detecting a straight line portion on each side of the detected foreground area;
   estimating a parameter of the detected straight line portion;
   calculating mutual alignment of the detected straight line portion;
   if the calculated mutual alignment corresponds to a rectangle shape, classifying the foreground areas into foreground areas having rectangle shapes;
   if the calculated mutual alignment corresponds to a straight line shape, classifying the foreground areas into foreground areas having straight line shapes;
   if a distance between the foreground areas having rectangle shapes does not exceed a predetermined value, classifying a portion of a background located between the foreground areas having rectangle shapes into a background area located between areas having rectangle shapes; and
   classifying areas that are not classified by the above classification into foreground areas having shapes other than rectangle shapes.

6. The method according to claim 5, wherein the combining the foreground areas into groups based on the classification result comprises:
   analyzing whether a crossing occurred by a descending order of sizes of rectangles in order to detect another area which crosses the foreground areas classified into the foreground areas having rectangle shapes;
   if the another crossed area is not an area classified into a background area located between the areas having rectangle shapes, as a result of the analysis, combining the another crossed area with the area having rectangle shapes into one group;
   updating coordinates of vertexes of the outline rectangle according to the combination;
   analyzing a difference of distance and skew angle of the foreground areas classified into areas having rectangle shapes and the foreground areas classified into areas having straight line shapes;

if the difference of distance and skew angle do not exceed a predetermined value, as a result of the analysis, combining the areas having straight line shapes and the areas having rectangle shapes into one group;

updating coordinates of vertexes of the outline rectangle according to the combination;

if there is searched a foreground area having a shape other than rectangle shape of which a distance from the foreground areas classified into the areas having rectangle shapes is smaller than a predetermined value, combining the foreground area having a shape other than a rectangle shape with the areas having rectangle shapes into one group;

updating coordinates of vertexes of the outline rectangle according to the combination;

searching for a foreground area having a shape other than a rectangle shape which is not grouped with the areas having rectangle shapes; and if there is searched a foreground area having a shape other than rectangle shape which is not grouped with the areas having rectangle shapes, as a result of the search, and a size of the area is bigger than a predetermined value, calculating coordinates of vertexes of the outline rectangle on the area.

7. The method according to claim 1, wherein:
the predetermined first operation is an operation of moving the selected object image to a free location of the combined image which is not occupied by the outline rectangle which includes the selected object image, and
the predetermined second operation is an operation of moving the selected object image inside the another outline rectangle other than the outline rectangle which includes the selected object image.

8. The method according to claim 7, wherein the moving operation is performed by a drag and drop operation.

9. A user terminal comprising:
a display unit which displays a GUI (Graphic User Interface) for editing a combined image which includes a plurality of object images;
a user interface unit which receives an input of a user manipulation on the GUI; and
a control unit which, when a predetermined first operation is performed on an object image selected from among object images located within an outline rectangle by performing a drag operation on the selected object from an internal portion of the outline rectangle to an outside of the outline rectangle, segments the selected object and another object image located within the outline rectangle, and when a predetermined second operation is performed on an object image within the outline rectangle selected from among object images by performing the drag operation on the selected object image into another outline rectangle other than the outline rectangle, combines the selected object image with another object image located within the another outline rectangle, and renews displaying of the outline rectangle according to the segmenting or combining;
wherein the outline rectangle is an identifier which forms outlines of the object image within the combined image, and
wherein coordinates of vertexes of the outline rectangle are determined by scaling the combined image with a predetermined resolution prior to converting the scaled combined image into a binary image, and calculating the coordinates of the vertexes using groups determined based on classifying areas of the binary image according to a predetermined category.

10. The user terminal according to claim 9, wherein the predetermined first operation is an operation of moving the selected object image to a free location of the combined image which is not occupied by the outline rectangle which includes the selected object image, and
the predetermined second operation is an operation of moving the selected object image inside the another outline rectangle other than the outline rectangle which includes the selected object image.

11. The user terminal according to claim 10, wherein the moving operation is performed by a drag and drop operation.

12. An image forming apparatus comprising:
a scanning unit which generates a combined image which includes a plurality of object images corresponding to a read manuscript;
a display unit which displays a GUI (Graphic User Interface) for editing the generated combined image;
a user interface unit which receives an input of a user manipulation on the GUI;
a control unit which, when a predetermined first operation is performed on an object image selected from among object images located within an outline rectangle by performing a drag operation on the selected object from an internal portion of the outline rectangle to an outside of the outline rectangle, segments the selected object and another object image located within the outline rectangle, and when a predetermined second operation is performed on an object image within the outline rectangle selected from among object images by performing the drag operation on the selected object image into another outline rectangle other than the outline rectangle, combines the selected object image with another object image located within the another outline rectangle, and renews displaying of the outline rectangle according to the segmenting or combining;
wherein the outline rectangle is an identifier which forms outlines of the object image within the combined image, and
wherein coordinates of vertexes of the outline rectangle are determined by scaling the combined image with a predetermined resolution prior to converting the scaled combined image into a binary image, and calculating the coordinates of the vertexes using groups determined based on classifying areas of the binary image according to a predetermined category.

13. The image forming apparatus according to claim 12, wherein the predetermined first operation is an operation of moving the selected object image to a free location of the combined image which is not occupied by the outline rectangle which includes the selected object image, and
the predetermined second operation is an operation of moving the selected object image inside the another outline rectangle other than the outline rectangle which includes the selected object image.

14. The image forming apparatus according to claim 13, wherein the moving operation is performed by a drag and drop operation.

15. A non-transient computer readable recording medium which stores a program code to perform an editing method in an apparatus for editing a combined image comprising a plurality of object images, the editing method comprising:
determining coordinates of vertexes of an outline rectangle which forms outlines of an object image within the combined image, and displaying the outline rectangle according to the determined coordinates of vertexes;
when a predetermined first operation is performed on an object image selected from among object images located within the outline rectangle by performing a drag operation on the selected object from an internal portion of the outline rectangle to an outside of the outline rectangle, segmenting the selected object image and another object image located within the outline rectangle;

when a predetermined second operation is performed on an object image within the outline rectangle selected from among object images by performing the drag operation on the selected object image into another outline rectangle other than the outline rectangle, combining the selected object image with another object image located within the another outline rectangle; and renewing displaying of the outline rectangle according the segmenting or combining, wherein the determining the coordinates of the vertexes includes scaling the combined image with a predetermined resolution prior to converting the scaled combined image into a binary image, and calculating the coordinates of the vertexes using groups determined based on classifying areas of the binary image according to a predetermined category.

16. A method of editing a combined image comprising a plurality of object images, the method comprising:

determining coordinates of vertexes of an outline rectangle which forms outlines of an object image within the combined image, and displaying the outline rectangle according to the determined coordinates of vertexes;

segmenting a selected object image from other object images located within the outline rectangle when a predetermined first operation is performed on the selected object image by performing a drag operation on the selected object from an internal portion to an outside of the outline rectangle;

combining a selected object image within the outline rectangle with another object image located within another outline rectangle other than the outline rectangle when a predetermined second operation is performed on the selected object image by performing the drag operation on the selected object image into the another outline rectangle; and updating the displaying to display the outline rectangle including the performed segmenting or combining operation, wherein the determining the coordinates of the vertexes includes scaling the combined image with a predetermined resolution prior to converting the scaled combined image into a binary image, and calculating the coordinates of the vertexes using groups determined based on classifying areas of the binary image according to a predetermined category.

17. A method of editing a combined image comprising a plurality of object images, the method comprising:

displaying an outline rectangle to be manipulated;

segmenting a selected object image from other object images within a displayed outline rectangle when a segmenting request is received by performing a drag operation on the selected object from an internal portion of the outline rectangle to an outside of the outline rectangle;

combining a selected object image within a displayed outline rectangle with another object image within another outline rectangle when a combining request is received by performing the drag operation on the selected object image into the another outline rectangle; and updating the displaying of the outline rectangle to illustrate the segmenting or combining result, wherein coordinates of vertexes of the outline rectangle are determined by scaling the combined image with a predetermined resolution prior to converting the scaled combined image into a binary image, and calculating the coordinates of the vertexes using groups determined based on classifying areas of the binary image according to a predetermined category.

18. A non-transient computer readable recording medium which stores a program code to perform an editing method, the method comprising:

determining coordinates of vertexes of an outline rectangle which forms outlines of an object image within the combined image, and displaying an outline rectangle according to the determined coordinates of vertexes;

segmenting a selected object image from other object images located within the outline rectangle when a predetermined first operation is performed on the selected object image by performing a drag operation on the selected object from an internal portion of the outline rectangle to an outside of the outline rectangle;

combining a selected object image within the outline rectangle with another object image located within another outline rectangle other than the outline rectangle when a predetermined second operation is performed on the selected object image by performing the drag operation on the selected object image into the another outline rectangle; and updating the displaying to display the outline rectangle including the performed segmenting or combining operation, wherein the determining the coordinates of the vertexes includes scaling the combined image with a predetermined resolution prior to converting the scaled combined image into a binary image, and calculating the coordinates of the vertexes using groups determined based on classifying areas of the binary image according to a predetermined category.

19. A non-transient computer readable recording medium which stores a program code to perform an editing method, the method comprising:

displaying an outline rectangle to be manipulated;

segmenting a selected object image from other object images within a displayed outline rectangle when a segmenting request is received by performing a drag operation on the selected object from an internal portion of the outline rectangle to an outside of the outline rectangle;

combining a selected object image within a displayed outline rectangle with another object image within another outline rectangle when a combining request is received by performing the drag operation on the selected object image into the another outline rectangle; and updating the displaying of the outline rectangle to illustrate the segmenting or combining result, wherein coordinates of vertexes of the outline rectangle are determined by scaling the combined image with a predetermined resolution prior to converting the scaled combined image into a binary image, and calculating the coordinates of the vertexes using groups determined based on classifying areas of the binary image according to a predetermined category.

* * * * *

UNITED STATES PATENT AND TRADEMARK OFFICE
CERTIFICATE OF CORRECTION

PATENT NO. : 9,179,035 B2
APPLICATION NO. : 13/551887
DATED : November 3, 2015
INVENTOR(S) : Ilya Vasilievich Kurilin et al.

It is certified that error appears in the above-identified patent and that said Letters Patent is hereby corrected as shown below:

ON THE TITLE PAGE

Item (57) Abstract, Line 15

Delete "according the" and insert --according to the--, therefor.

IN THE CLAIMS

Claim 1, Column 17, Line 25

Delete "according the" and insert --according to the--, therefor.

Claim 3, Column 17, Line 57

Delete "according the" and insert --according to the--, therefor.

Claim 15, Column 21, Line 13

Delete "according the" and insert --according to the--, therefor.

Signed and Sealed this
Second Day of February, 2016

Michelle K. Lee
*Director of the United States Patent and Trademark Office*